United States Patent
Hsieh et al.

(10) Patent No.: US 10,652,322 B2
(45) Date of Patent: **\*May 12, 2020**

(54) SCALABLE PARALLEL MESSAGING PROCESS

(71) Applicant: International Business Machines Corporation, Armonk, NY (US)

(72) Inventors: Wen-Chin Hsieh, Rolling Hills Estates, CA (US); Alan T. Yaung, San Jose, CA (US); Ang Yi, Beijing (CN)

(73) Assignee: International Business Machines Corporation, Armonk, NY (US)

( \* ) Notice: Subject to any disclaimer, the term of this patent is extended or adjusted under 35 U.S.C. 154(b) by 150 days.

This patent is subject to a terminal disclaimer.

(21) Appl. No.: 14/641,533

(22) Filed: Mar. 9, 2015

(65) Prior Publication Data

US 2016/0266944 A1    Sep. 15, 2016

(51) Int. Cl.
*G06F 9/54* (2006.01)
*H04L 29/08* (2006.01)

(52) U.S. Cl.
CPC .......... *H04L 67/1029* (2013.01); *G06F 9/542* (2013.01); *G06F 9/546* (2013.01); *H04L 67/1014* (2013.01); *H04L 67/1023* (2013.01)

(58) Field of Classification Search
None
See application file for complete search history.

(56) References Cited

U.S. PATENT DOCUMENTS

| | | | |
|---|---|---|---|
| 6,687,700 B1 | 2/2004 | Cornelius et al. | |
| 7,360,025 B1 * | 4/2008 | O'Connell | G06F 17/30902 707/999.201 |
| 7,509,653 B2 | 3/2009 | Das et al. | |
| 7,519,652 B2 * | 4/2009 | Page | G06F 9/5033 370/450 |
| 8,005,006 B2 | 8/2011 | Niemczyk et al. | |
| 8,473,786 B2 | 6/2013 | Morimura et al. | |
| 2003/0014558 A1 | 1/2003 | Amamiya et al. | |
| 2005/0243740 A1 * | 11/2005 | Chen | H04L 67/2804 370/256 |
| 2009/0157684 A1 * | 6/2009 | Andersen | G06F 9/5083 |
| 2009/0182610 A1 | 7/2009 | Palanisamy et al. | |
| 2009/0210586 A1 * | 8/2009 | Tanabe | H04L 45/745 710/52 |

(Continued)

OTHER PUBLICATIONS

Dauwels et al.; "Quantifying Statistical Interdependence by Message Passing on Graphs—Part I: One Dimensional Point Processes", Neural Computation, MIT Press, 21.8 (2009): 2203-2268, IEEE vol. 21, Issue 8, May 19, 2014, pp. 2152-2202.
Dauwels et al.; "Quantifying Statistical Interdependence by Message Passing on Graphs—Part II: Multidimensional Point Processes", Neural Computation, MIT Press, 21.8 (2009): 2203-2268, IEEE vol. 21, Issue 8, May 19, 2014, pp. 2203-2268.

(Continued)

*Primary Examiner* — Shih-Wei Kraft
(74) *Attorney, Agent, or Firm* — Mollborn Patents, Inc.; Fredrik Mollborn

(57) ABSTRACT

Methods and apparatus, including computer program products, implementing and using techniques for event processing in a content management system. In response to determining that an inter-dependence exists between two or more events in the content management system, a same group event key is assigned to each inter-dependent event. All events having the same group event key are distributed to a same event processing node on a consistent hashing ring.

5 Claims, 5 Drawing Sheets

(56) References Cited

U.S. PATENT DOCUMENTS

| | | | |
|---|---|---|---|
| 2009/0271412 A1* | 10/2009 | Lacapra | G06F 17/30206 |
| 2009/0316687 A1* | 12/2009 | Kruppa | H04M 3/51 |
| | | | 370/352 |
| 2010/0268808 A1* | 10/2010 | Chkodrov | G06F 11/2028 |
| | | | 709/223 |
| 2010/0324948 A1 | 12/2010 | Kumar et al. | |
| 2012/0271943 A1* | 10/2012 | Chen | H04L 45/745 |
| | | | 709/224 |
| 2012/0284221 A1 | 11/2012 | Shelton et al. | |
| 2013/0173530 A1* | 7/2013 | Laron | G06F 17/30165 |
| | | | 707/608 |
| 2014/0199977 A1 | 7/2014 | Kim et al. | |
| 2014/0334739 A1 | 11/2014 | Umanesan | |
| 2016/0028630 A1* | 1/2016 | Wells | H04L 45/44 |
| | | | 370/389 |

OTHER PUBLICATIONS

Qian et al.; "REIN: A Fast Event Matching Approach for Content-Based Publish/Subscribe Systems", IEEE INFOCOM 2014, Proceedings IEEE Conference on Computer Communications, Apr. 27-May 2, 2014, pp. 2058-2066.

Scuturici et al.; "Dependency Detection in Interval-Based Event Streams", DANS 3rd Workshop on New Frontiers in Mining Complex Patterns (NFMCP 2014), in Conjunction With ECML-PKDD 2014, Sep. 2014, pp. 74-86.

Xin et al.; "Detection for Conflicts of Dependencies in Advanced Transaction Models", Database Engineering and Application Symposium, IDEA'05, 2005 IEEE 9th International Conference on, Jul. 25-27, 2005, 10 pp.

List of IBM Patents or Patent Applications Treated as Related.

* cited by examiner

110

| EVENT | ITEM TYPE | EVENT TYPE | ATTRIBUTE MAP1 | ATTRIBUTE MAP2 |
|---|---|---|---|---|
| A1 | ITEM TYPE A | 301 | ATTR 1 | ATTR 2 |
| A2 | ITEM TYPE A | 302 | ATTR 1 | ATTR 2 |
| B | ITEM TYPE B | 301 | ATTR 1 | ATTR 3 |
| C | ITEM TYPE C | 307 | ATTR 4 | ATTR 5 |

SCALABLE PARALLEL MESSAGING PROCESS

BACKGROUND

The present invention relates to Content Management Systems (CMSs), and more specifically, to a scalable parallel messaging process in a CMS.

In a CMS, it is often necessary to exchange event messages with one or more external systems when some particular action occurs, for example, when an item or a document is created. However, for inter-dependent events, this may result in various problems. Inter-dependent (transactional) events refer to events that are triggered and inter-related with each other to complete the whole transaction. The inter-dependent events must be processed in a sequential order to maintain event or data integrity. If the inter-dependent events were to be processed in parallel, a "race condition" could occur, which might violate the event integrity. As an example, a "delete" event might be processed before a "reindex" event.

One possible solution to this problem is to process inter-dependent events in sequential order, but as the skilled person realizes, this becomes a bottleneck in event processing and has a negative impact on the performance scalability of the overall event processing. Thus, there is a need for better techniques for exchanging event messages between a CMS and one or more external systems.

SUMMARY

According to one embodiment of the present invention, techniques are described for event processing in a content management system. In response to determining that an inter-dependence exists between two or more events in the content management system, a same group event key is assigned to each inter-dependent event. All events having the same group event key are distributed to a same event processing node on a consistent hashing ring.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

In general, the various embodiments of the invention provide techniques for determining whether or not inter-dependence between event messaging exists, by using a set of predefined rules. A unique event group key is assigned for each group of inter-dependent events. By searching for the event group key location on a consistent hashing ring, all inter-dependent events can be dispatched to the same processing node, where they are processed sequentially, so as to ensure event/data integrity. By using the same consistent hashing algorithm for all events, all the independent groups of inter-dependent events can be distributed onto different parallel processing nodes for better performance scalability. The events can be easily stored into an event table and then be pulled out for processing. Alternatively, in some embodiments, the events can be pushed into an event processor for processing.

Figure 1:
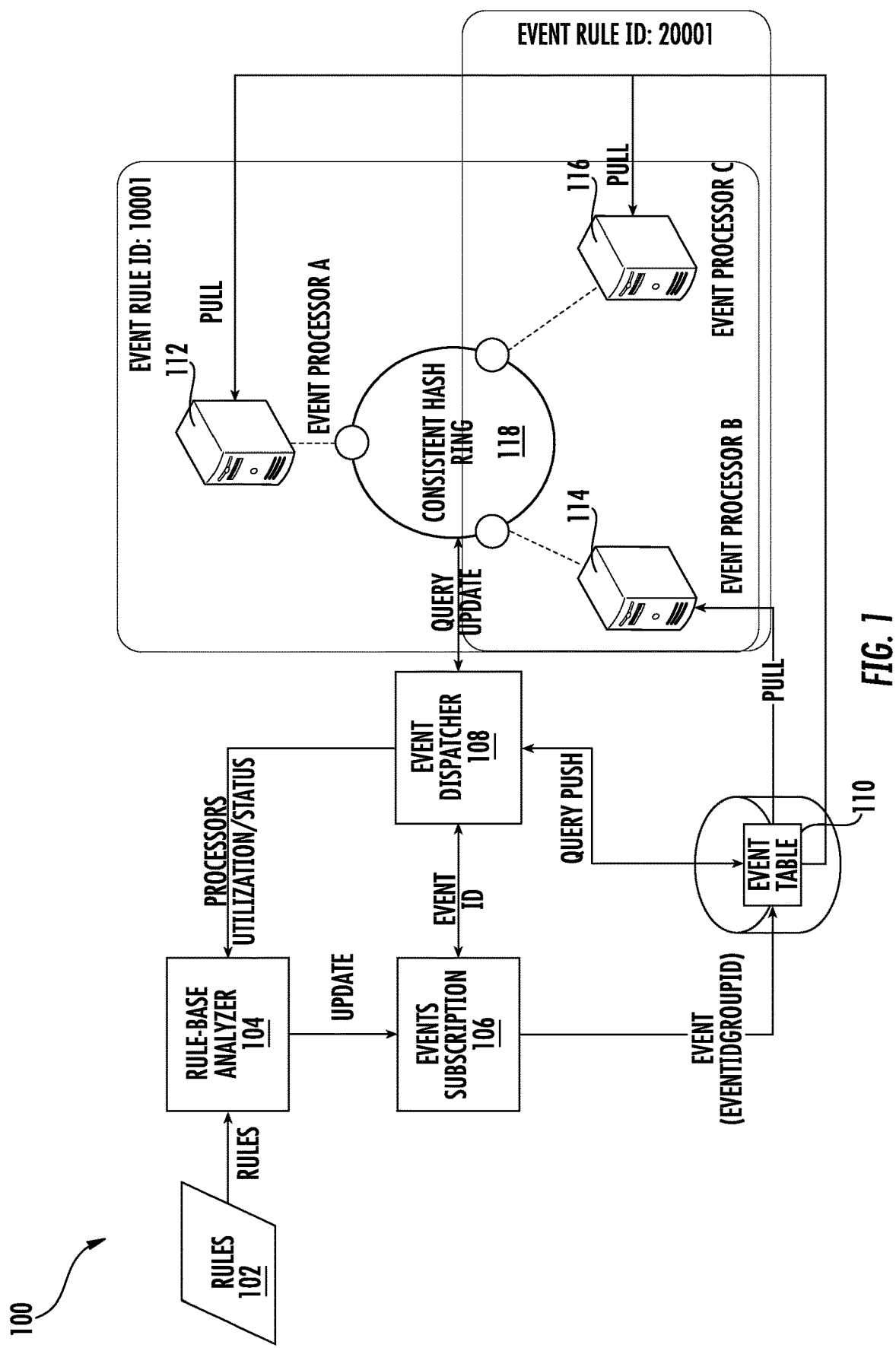
FIG. 1 shows a schematic overview parallel event processing, in accordance with one embodiment.

FIG. 1 shows a schematic overview parallel event processing in accordance with one embodiment. An event subscription 106 is an item type structure that associates an event that occurs on an item type with an application. Examples of events may include a "Create Document" event, "Add document to folder" event, etc. According to predefined event rules 102 for event-enabled item types, the event subscription 106 determines a unique event group key, and assigns the event group key to correlate all inter-dependent (i.e., related) events.

In addition to the event group key, each event typically also includes an event identifier (event ID), an event process status, and a message body. This information is queued in an event table 110 for an event dispatcher 108.

A Rule-Base Analyzer 104 manages all pre-defined rules 102 on event-enabled item types. The rule-base analyzer 104 also queries the event dispatcher 108 about the status or utilization of any given event processor node 112, 114, 116. As will be described in further detail below, a system administrator can to adjust the scope of rules for node utilization, in order to balance the workload among the different event processor nodes 112, 114, 116.

In one embodiment, a pre-defined rule 102 is used to determine whether is any inter-dependence between events, but does not describe the details of such a discovered relationship. One example of such a pre-defined rule 102 is as follows:

```
Rule ID : EventRule10001
{
Ring ID      : RING65866895
Nodes        : ALL
Event Relationship :
{
Item Type A : Event 301
Item Type A : Event 302
Item Type B : Event 301
Item Type C : Event 307
}
Event Attributes :
{
<Item Type A : Attribute 1> - <Item Type B : Attribute 1 >
<Item Type A : Attribute 2> - <Item Type B : Attribute 3 >
<Item Type C : Attribute 4> - <Item Type B : Attribute 1 >
<Item Type C : Attribute 5> - <Item Type B : Attribute 3 >
}
}
```

The "Ring ID" in the above rule is a unique identifier for a consistent hashing ring in the CMS. "Nodes" represents the processor nodes that are available for event distribution through this rule in the hashing ring. By default, <ALL> is used to indicate all available nodes for the hashing ring. The "Event Relationship" field is used to identify the events that are inter-dependent. Here, an event is represented as a pair consisting of an item type name and an event type.

Figures 2, 3:
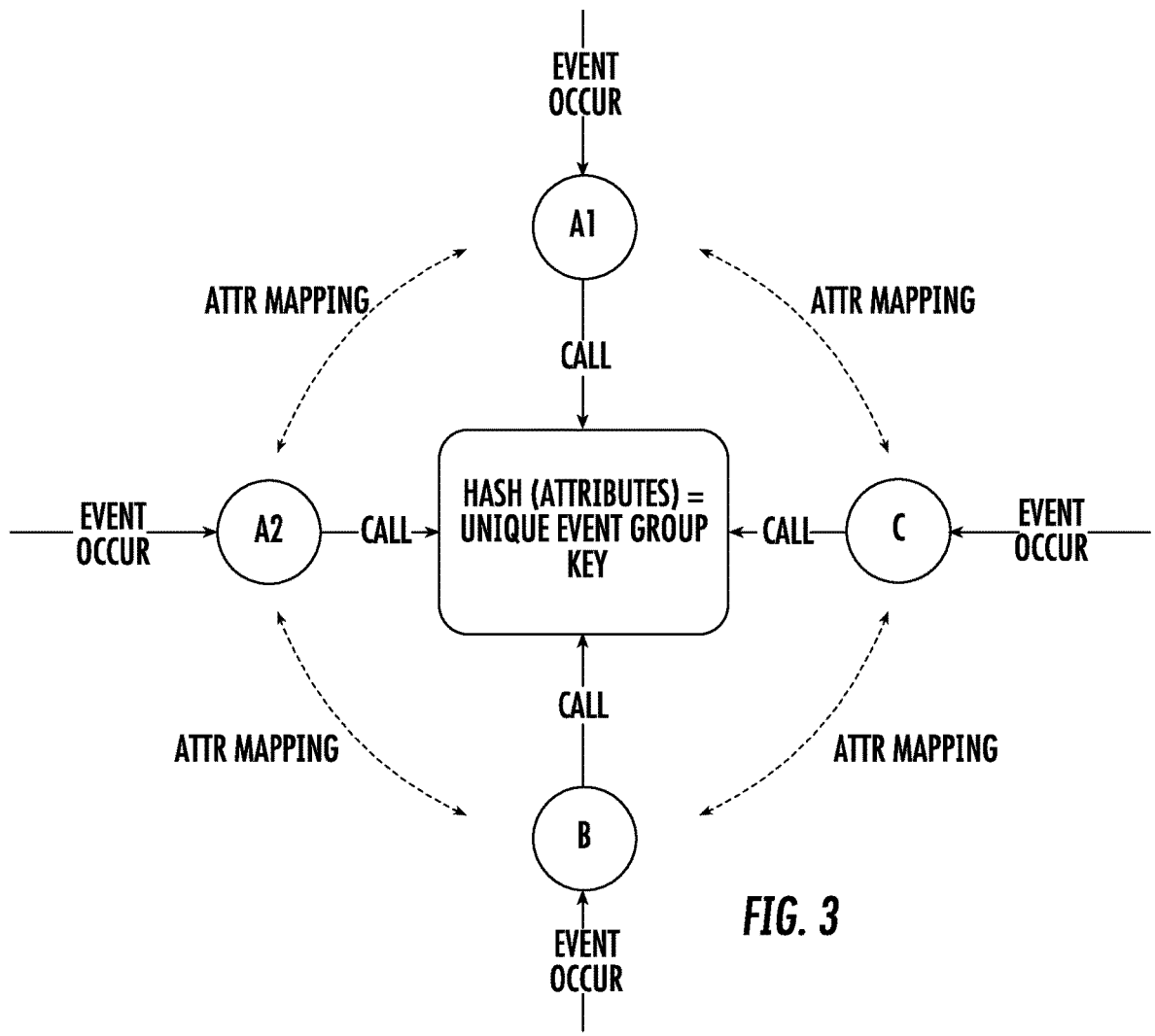
FIG. 2 shows an event table, in accordance with one embodiment.
FIG. 3 shows a schematic view of hashing event group keys, in accordance with on embodiment.

"Event attributes" are attributes that are common between various events. The attributes may have different names defined for different item types, but their values should be logically identical. FIG. 2 shows an event table 110 with events 1, A2, B and C. The inter-dependence between these events can be represented as:

FUNC1 (Item Type A.Attr1, Item Type A.Attr2 ) = FUNC2 (Item Type B.Attr1, Item Type B.Attr3) = FUNC3 (Item Type C.Attr4, Item Type C.Attr5) ;

where FUNC1, FUNC2, FUNC3 are relationship functions that map attributes between different item types. For example, assume that item type A has a single attribute named 'transcation_id', and item type B has two attributes 'shop_id', 'catalog', 'item_id' and 'timestamp'. Then, Transcation_ID=FUNC (shop_id', 'catalog', 'item_id', 'timestamp')='shop_id'+'catalog'+'item_id'+'timestamp'

If no common attributes exist between item types, then there is no relationship between the events in the CMS. Thus, as can be seen in the "Attribute Map 1" column of the event table 110 of FIG. 2, 1.attr1=A2.attr1=B.attr1=C.attr4. Of course, the relationship of attributes between item types can be more complicated through a relationship function, as the skilled person realizes.

When an event (such as 1, A2, B, or C) occurs, the event subscription 106 retrieves the actual values of common attributes, and calls a hashing function to generate a unique event group key based on the value of the common attribute(s). This is schematically illustrated in FIG. 3. The event dispatcher 108 then dispatches the events to the hashing ring. For example, if event 1 occurs, and a new item is created with attr1=value 1 and attr2=value 2, then the event group key can be calculated through:

Event group key=Hash (Rule ID, FUNC1 (value 1, value 2));

The event type/item type pair belongs to one pre-defined rule only. Thus, by searching the hashing ring 118 for the processing node 112, 114, 116 associated with a particular event group key, the dispatcher 108 can deliver any inter-dependent events to the same processing node 112, 114, 116 in the hashing ring 118, at which processing node the events will be processed in sequential order. Events that have different event group keys are distributed through a consistent hash algorithm for parallel processing at different processing nodes 112, 114, 116.

In some embodiments, the workload of the processing nodes 112, 114, 116 can be balanced by a system administrator through event rule adjustment. For example, assume that there are three event processors: Node A 112, Node B 114, and Node C 116 and two item types, and that the hardware capacity of Node B 114 and Node C 116 is much more powerful than the hardware capacity of Node A 112. By monitoring a current status and/or utilization of the event processing nodes 112, 114, 116 that are tracked by the event dispatcher 108, a system administrator may observe, for example, that Node A 112 is overloaded, but that Node B 114 and Node C 116 are nearly at idle status. In order to balance the workload on the three event processing nodes 112, 114, 116, the system administrator can adjust in the rule 102 how the processor nodes 112, 114, 116 are chosen (e.g., ALL->Node B, C, which excludes Node A as a processing node) through the Rule-Based Analyzer 104. Thus, the workload on Node A 112 will be dynamically moved onto Node B 114 and Node C 116 for faster processing.

The event dispatcher 108 periodically searches the event 110 table and gets the candidates ready for event processing. For each event that is ready for processing, the event dispatcher 108 uses a consistent hashing algorithm to create the event group key. Based on the event group key, the processing node 112, 114, 116 of the event in the consistent hashing ring 118 can be determined and the event can be mapped to the corresponding event processing node 112, 114, 116. The available processing nodes are stored in a local database, to which the event dispatcher 108 can refer. If the event process node 112, 114, 116 is unavailable, the event dispatcher 108 ignores all events on this node and the ignored events wait for the next scan.

The other function of the event dispatcher 108 is to periodically examine the availability and resource utilization (CPU etc.) of the processing nodes 112, 114, 116. When a processing node 112, 114, 116 becomes unavailable, the event dispatcher 108 immediately stops assigning events to that node, but continues to check the availability of the node 112, 114, 116. If the node 112, 114, 116 is still unavailable after a given time limit the unavailable processing node 112, 114, 116 is removed from the consistent hashing ring 118 and all unprocessed events on the node are moved to a different processing node on the ring. If the node 112, 114, 116 becomes available within the given time limit, the event dispatcher 108 continues to push events to this node 112, 114, 116 in a new scan cycle. In the event that the process node is entirely gone (i.e., the processing node has even lost the event data), the event data is recovered from the event table 110. The time limit for when to consider a node being gone may vary based on, for example, the business purpose of the CMS. For example, if a node remains off-line for a day, then the node might be removed.

When a new processing node 112, 114, 116 is registered into the hashing ring 118, the event dispatcher 108 first marks the new processing node as 'Pending', which disallows any event processing by the new processing node. The event dispatcher 108 also determines what other processing nodes on the hashing ring 118 will be affected by the addition of the new node, and 108 stops pushing events to these affected processing nodes. All existing events on these affected nodes are moved to adjacent nodes, after processing of existing events on the adjacent nodes have been completed. Finally, the event dispatcher 108 enables the new node (available status) and re-maps all related events according the new hashing ring 118 in the next scan cycle.

The event processing nodes 112, 114, 116 serve as work unit for actual event processing, and always process all their designated events in sequential order. The event processor at each event processing node 112, 114, 116 pulls events from the event table 110 and updates the status of the events from "unprocessed" to "processed" in the event table 110, so that the event dispatcher 108 knows which events have been processed.

The event processors receive a heartbeat from the event dispatcher 108 and returns an "available" signal. If no heartbeat is received from the event dispatcher 108, the event processors immediately stop processing any events.

Figure 4:
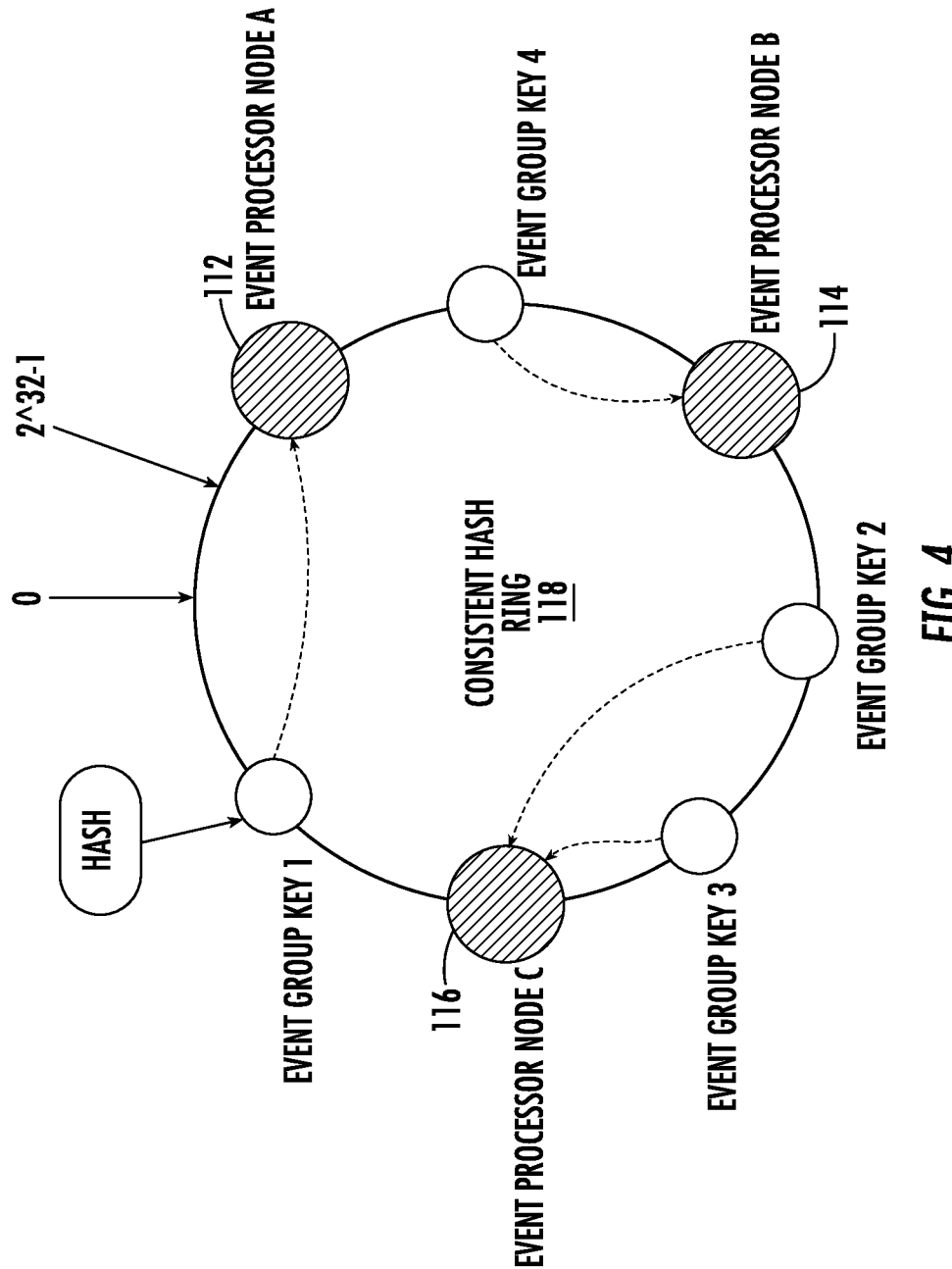
FIG. 4 shows an initial assignment of events to processing nodes, in accordance with one embodiment.

FIG. 4 shows how events are dispatched through a consistent hashing ring 118. In accordance with one embodiment, a consistent hashing ring 118 is used to map each available processing node 112, 114, 116 to a point on the edge of a circle, then pseudo-randomly distribute events on the edge of the same circle by using the same hashing algorithm. To find where an event should be located, the system finds the location of the event group key on the edge of the circle, then goes around the circle until falling into the first bucket it encounters. As can be seen in FIG. 4, events associated with event group key 1 are processed by event processing node A 112, events associated with event group key 2 are processed by event processing node C 116, events associated with event group key 3 are also processed by event processing node C 116, and events associated with event group key 4 are processed by event processing node B 114.

Figure 5:
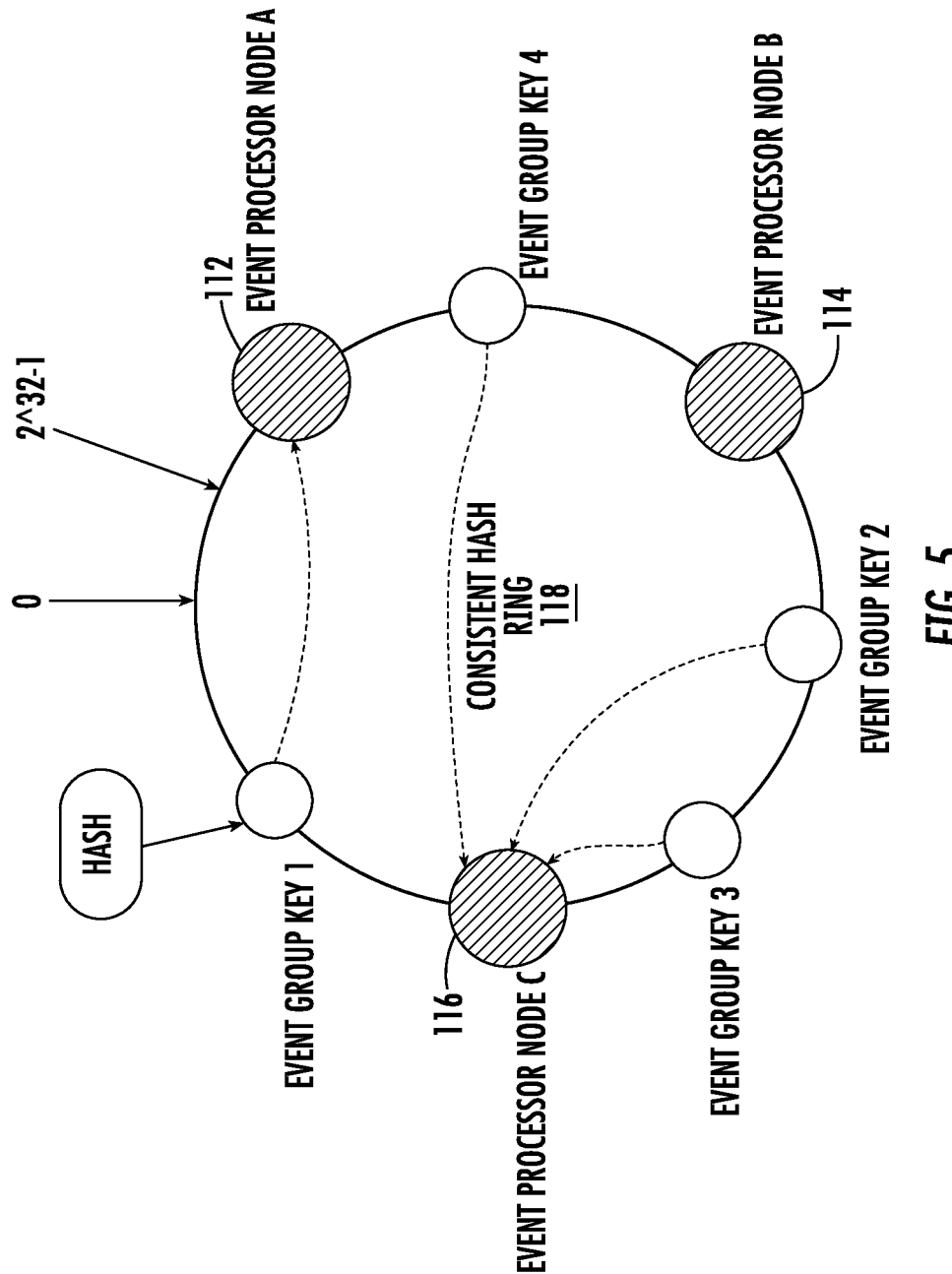
FIG. 5 shows how events are redistributed when a processing node becomes unavailable, in accordance with one embodiment.

FIG. 5 shows how a process node is removed from the hashing ring. When a processing node become unavailable, the event dispatcher 108 will no longer receive the "available" signal from the processing node, and will thus mark the processing node as "unavailable". In this state, the event dispatcher 108 immediately stops pushing any events to the unavailable node, but continues to check the node status periodically. If the node remains unreachable within a given time limit (e.g., 30 minutes), the event dispatcher 108 removes this processing node from the hashing ring 118 and moves all unprocessed events to next processing node. As can be seen in FIG. 5, in this exemplary case, Node B 114 become unavailable, and the event dispatcher 108 stops pushing any events to Node B 114 and periodically checks the availability of Node B 114. If Node B 114 remains unavailable for a given time limit, the dispatcher removes Node B 114 from the hashing ring, and moves all unprocessed events (i.e., events with event group key 4) to next node, i.e., Node C 116. If Node B 114 returns within the given limit, the event dispatcher 108 resumes event delivery for processing.

Figure 6:
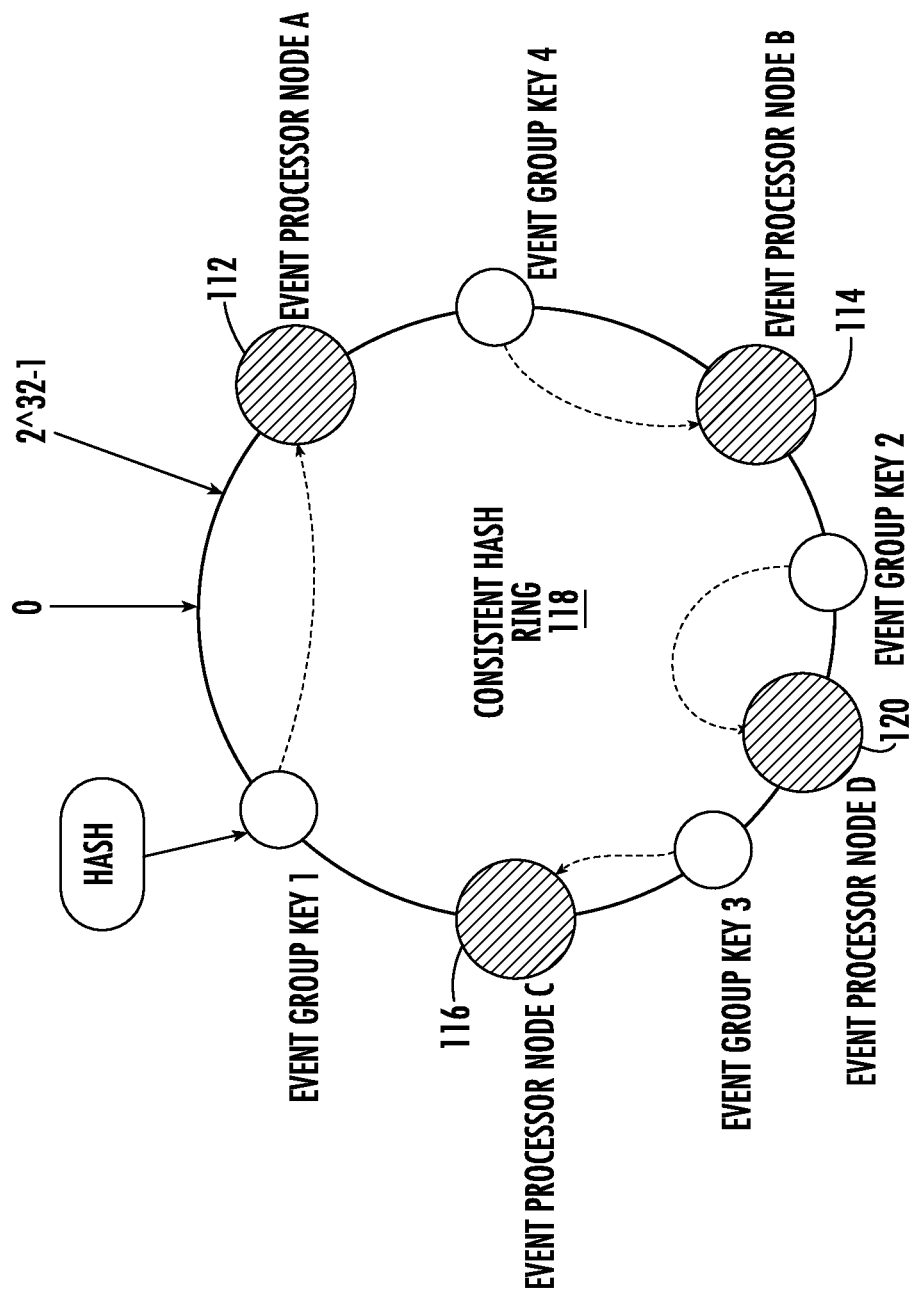
FIG. 6 shows how events are redistributed when adding a new processing node, in accordance with one embodiment.

FIG. 6 shows how a new processing node 120 is registered into the hashing ring 118. When a new processing node 120 is registered into the hashing ring 118, the event dispatcher 108 does NOT mark the new processing node 120 as available immediately, but instead puts the new processing node 120 into a "Pending" state. Next, the event dispatcher 108 calculates the new hashing ring and determines which processing nodes in the new hashing ring 118 are affected due to newly registered processing node 120. The event dispatcher 108 stops event processing on the affected nodes, enables the new processing node 120, and remaps events according to the new ring 118. For non-affected processing nodes, the event dispatcher 108 continues event delivery as usual. As can be seen in FIG. 6, in this case, Node D 120 was newly added into hashing ring. By calculation. Node C 116 will be affected. The event dispatcher 108 therefore stops event processing on Node C 116, and remaps events with event group keys 3 and 4 in the new ring 118. Events with event group key 3 will be processed by Node C 116, but events with event group key 2 will be assigned to new processing Node D 120.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for inter-dependent event message processing in a content management system, the computer program product comprising a computer readable storage medium having program instructions embodied therewith, wherein the computer readable storage medium is not a transitory signal per se, the program instructions being executable executed by a processor to cause the processor to perform a method comprising:

receiving a first transactional event in the content management system, the first transactional event including a first set of attribute values, and one or more of: a first event identifier, a first event process status, and a first event message body;

receiving a second transactional event in the content management system, the second transactional event including a second set of attribute values, and one or more of: a second event identifier, a second event process status, and a second event message body;

in response to determining, by the processor and based on a set of pre-defined rules, that an inter-dependence exists between the first transactional event and the second transactional event, the inter-dependence requiring the first transactional event and the second transactional event to be processed in a sequential order in order to maintain data integrity of a transaction involving the first transactional event and the second transactional event, assigning, by the processor, a same event group key to the first transactional event and to the second transactional event, wherein the event group key is generated by a hashing function based on common attribute values in the first set of attribute values and the second set of attribute values;

distributing, by the processor, all transactional events having a same event group key to a same event processing node on a consistent hashing ring;

processing in parallel, by each event processing node on the consistent hashing ring, groups of inter-dependent transactional events; and in response to detecting, by the processor, that a processing node is unavailable, removing, by the processor, the processing node from the consistent hashing ring and transferring, by the processor, transactional events assigned to the unavailable processing node from the unavailable processing node to a different processing node on the consistent hashing ring.

2. The computer program product of claim 1, wherein the method further comprises:

storing, by the processor, the transactional events in an event table from which event processing nodes pull transactional events for processing.

3. The computer program product of claim 1, wherein the method further comprises:

balancing, by the processor, the utilization of different processing nodes based on a workload for each processing node.

4. The computer program product of claim 1, wherein the method further comprises:

in response to adding a processing node to the consistent hashing ring, remapping, by the processor, transactional events on processing nodes affected by the addition of the new processing node, while leaving processing nodes not affected by the new processing node unchanged.

5. A system for event message processing in a content management system, comprising:

a processor; and a memory containing program instructions being executed by the processor to cause the processor to perform a method comprising:

receiving a first transactional event in the content management system, the first transactional event including a first set of attribute values, and one or more of: a first event identifier, a first event process status, and a first event message body;

receiving a second transactional event in the content management system, the second transactional event including a second set of attribute values, and one or more of: a second event identifier, a second event process status, and a second event message body;

in response to determining, by the processor and based on a set of pre-defined rules, that an inter-dependence exists between the first transactional event and the second transactional event, the inter-dependence requiring the first transactional event and the second transactional event to be processed in a sequential order in order to maintain data integrity of a transaction involving the first transactional event and the second transactional event, assigning, by the processor, a same event group key to the first transactional event and to the second transactional event, wherein the event group key is generated by a hashing function based on common attribute values in the first set of attribute values and the second set of attribute values;

distributing, by the processor, all transactional events having a same event group key to a same event processing node on a consistent hashing ring;

processing in parallel, by each event processing node on the consistent hashing ring, groups of inter-dependent transactional events; and in response to detecting, by the processor, that a processing node is unavailable, removing, by the processor, the processing node from the consistent hashing ring and transferring, by the processor, transactional events assigned to the unavailable processing node from the unavailable processing node to a different processing node on the consistent hashing ring.

* * * * *